US006859321B2

(12) United States Patent
Kimerling et al.

(10) Patent No.: US 6,859,321 B2
(45) Date of Patent: Feb. 22, 2005

(54) LOW VOLTAGE TUNABLE PHOTONIC CRYSTAL WITH LARGE DEFECTS AS WAVELENGTH ROUTING

(75) Inventors: Lionel C. Kimerling, Concord, MA (US); Kazumi Wada, Lexington, MA (US); Yasha Yi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/402,504

(22) Filed: Mar. 28, 2003

(65) Prior Publication Data

US 2003/0223699 A1 Dec. 4, 2003

Related U.S. Application Data

(60) Provisional application No. 60/422,747, filed on Oct. 31, 2002, and provisional application No. 60/368,498, filed on Mar. 29, 2002.

(51) Int. Cl.[7] .............................................. G02B 27/00
(52) U.S. Cl. ........................ 359/578; 359/577; 359/260; 356/454
(58) Field of Search ........................ 359/260, 577–579; 356/454, 480, 506

(56) References Cited

U.S. PATENT DOCUMENTS

| | | | | |
|---|---|---|---|---|
| 4,825,262 A | * | 4/1989 | Mallinson ................... | 356/454 |
| 4,859,060 A | * | 8/1989 | Katagiri et al. ............. | 356/454 |
| 2002/0031155 A1 | | 3/2002 | Tayebati et al. | |
| 2004/0136076 A1 | * | 7/2004 | Tayebati ..................... | 359/578 |

OTHER PUBLICATIONS

A.T.T.D. Tran et al., "Surface micromachined Fabry–Perot tunable filter", IEEE Photonics Technology Letters, 8(3), pp. 393395(1996).*
H.Hillmer et al., "Ultra–wide continuosly tunable 1.55 micron vertical air–cavity filters and VCSEL's based on micromachined electrostatic actuation", Proc. of IEEE vol. 4646, Photonics West, San Jose, Jan. 2002.*

"Surface Micromachined Fabry–Perot Tunable Filter," Tran et al. IEEE Photonics Technology Letters. Mar. 1996. vol. 8, No. 3.
"Dynamics of gain in vertical cavity lasers and amplifiers at 1.53 um using Femtosecond photoexcitation," Bouche et al. Applied Physics Letters. Nov. 1998. vol. 73, No. 9.
"Low Threshold, Room Temperature Pulsed Operation of 1.5 um Vertical–Cavity Surface–Emitting Lasers with an Optimized Multi–Quantum Well Active Layer," Umoi et al. IEEE Photonics Technology Letters. Mar. 1994. No. 3.
"Tunable Multichannel Optical Filter based on Silicon Photonic Band Materials Actuation," Yi et al. Applied Physics Letters. Nov. 2002. vol. 81, No. 22.
"Low Voltage Tunable One Dimensional Photonic Crystal with Large Air Defects," Yi et al. Mat. Res. Soc. Symp. Proc. 2002. vol. 722.
"Potential for Micromachined Actuation of ultra–wide continuously tunable optoelectronic devices," Hillmer et al. Applied Physics B: Lasers and Optics. Aug. 2002. vol. 75.
"Ultra–wide continuously tunable 1.55um vertical air–cavity filters and VCSEL's based on micromachined electrostatic actuation," Hillmer et al. Proceedings of SPIE vol. #4646, Photonics West, San Jose, Jan. 19–25, 2002.
"Design and Analysis of Micromechanical Tunable Interferometers for WDM Free–Space Optical Interconnection," Toshiyoshi et al. Journal of Lightwave Technology. Jan. 1999. vol. 17, No. 1.

* cited by examiner

Primary Examiner—Leo Boutsikaris
(74) Attorney, Agent, or Firm—Gautier & Connors LLP

(57) ABSTRACT

A photonic bandgap device includes a first mirror region including alternating layers of different materials. A second mirror region includes alternating layers of different materials. An air gap cavity region is positioned between the first mirror region and second region. The air gap cavity changes its thickness when a voltage is applied so that the device is tuned to a particular resonant wavelength.

44 Claims, 8 Drawing Sheets

LOW VOLTAGE TUNABLE PHOTONIC CRYSTAL WITH LARGE DEFECTS AS WAVELENGTH ROUTING

PRIORITY INFORMATION

This application claims priority from provisional application Ser. No. 60/368,498 filed Mar. 29, 2002, and 60/422,747 filed Oct. 31, 2002, both of which are incorporated herein by reference in their entirety.

This invention was made with government support under Grant No. ECS.-0085680 awarded by NSF. The government has certain rights in the invention.

BACKGROUND OF THE INVENTION

The invention relates to the field of photonic band gap devices, and in particular to a PBG device using a large air gap defect to tune its resonant wavelength.

In wavelength division multiplexing (WDM), tunability of add-drop wavelengths is important. Various devices can be used to accomplish tuning, such as thermal tuning, MEMS tuning, and electro-optical tuning. However, the prior art has not demonstrated a multichannel and tunable add/drop filter having telecom wavelengths of 1.5 $\mu$m and 1.3 $\mu$m that performs continuous tunability through optical communication bands. Thus, there is a need in the art for a multichannel tunable add/drop filter that performs continuous tuning in terms of voltage on a one dimensional (1-D) photonic bandgap (PBG) device with an air defect.

SUMMARY OF THE INVENTION

According to one aspect of the invention, there is provided a photonic bandgap device. The photonic bandgap device includes a first mirror region including alternating layers of different materials. A second mirror region includes alternating layers of different materials. An air gap cavity region is positioned between the first mirror region and second region. The air gap cavity changes its thickness when a voltage is applied so that the device is tuned to a particular resonant wavelength.

According to another aspect of the invention, there is provided a method of forming a photonic bandgap device. The method includes providing a first mirror region including alternating layers of different materials. Moreover, the method includes providing a second mirror region including alternating layers of different materials. Furthermore, the method includes forming an air gap cavity region that is positioned between the first mirror region and second region. The air gap cavity changes its thickness when a voltage is applied so that the device is tuned to a particular resonant wavelength.

According to another aspect of the invention, there is provided an optical filter. The optical filter includes a first mirror region including alternating layers of different materials. A second mirror region includes alternating layers of different materials. An air gap cavity region is positioned between the first mirror region and second region. The air gap cavity changes its thickness when a voltage is applied so that the device is tuned to a particular resonant wavelength.

According to another aspect of the invention, there is provided a method of performing optical filtering. The method includes providing a first mirror region including alternating layers of different materials. Moreover, the method includes providing a second mirror region including alternating layers of different materials. Furthermore, the method includes using an air gap cavity region that is positioned between the first mirror region and second region. The air gap cavity changes its thickness when a voltage is applied so that the device is tuned to a particular resonant wavelength.

DETAILED DESCRIPTION OF THE INVENTION

Figure 1:
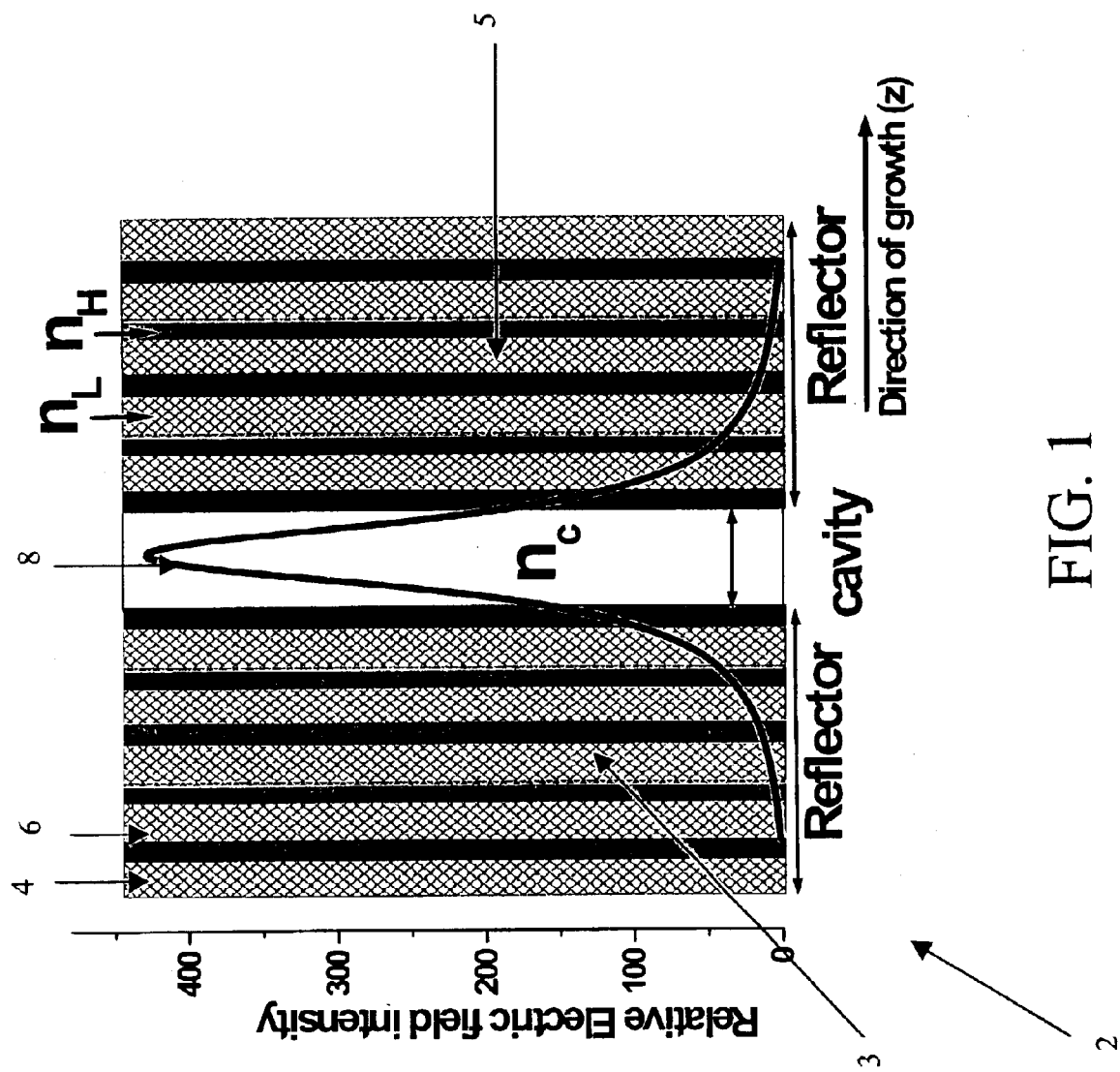
FIG. 1 is a schematic diagram of a tunable photonic-bandgap (PBG) device.

FIG. 1 is a schematic diagram of a tunable photonic bandgap (PBG) device 2. The PBG device 2 includes two optical mirrors reflectors 3, 5 having two alternating layers 4, 6 of Si and SiO$_2$. Moreover, the device 2 includes a cavity region 8 positioned between the mirrors 3, 5. Multiple localized states are produced within the cavity 8 when the PBG device 2 receives a broadband wavelength of light. The thickness of the alternating layers of Si and SiO$_2$ are 0.11 $\mu$m and 0.26 $\mu$m, respectively. The cavity region 8 is comprised of a dielectric layer, such as SiO$_2$. Also, the PBG device 2 has a one-dimensional PBG. However, other embodiments of the PBG device 2 can be 2-D PBG or more.

The PBG device 2 realizes low power tuning and switching and wide tunable range between 1.3 and 1.6 microns. This can occur by changing the refractive index of the cavity region 8 using Free Carrier injection (Plasma Effect). The Micro-Electro-Mechanical-System (MEMS) method can be used for tuning by changing the thickness of the PBG device 2. The PBG device 2 can increase the effective optical length as light bounces back and forth inside its cavity region 8. Other nonlinear optical effects can used to tune the PBG device 2.

The actual physical size of the PBG device 2 can be reduced so that micro-scale active photonic devices are possible, and it has many advantages compared to the conventional MZ type switches and modulators. The defect formation in the PBG device 2 causes certain wavelengths to be strongly confined in the cavity region 8, thus making the PBG device 2 excellent as a wavelength add/drop filter.

In other embodiments, the PBG device 2 can be comprised of two alternating 3, 5 layers of materials having large index of refractions. These materials must display a large enough index of refraction to ensure strong reflection at a large incident angle.

Figure 2:
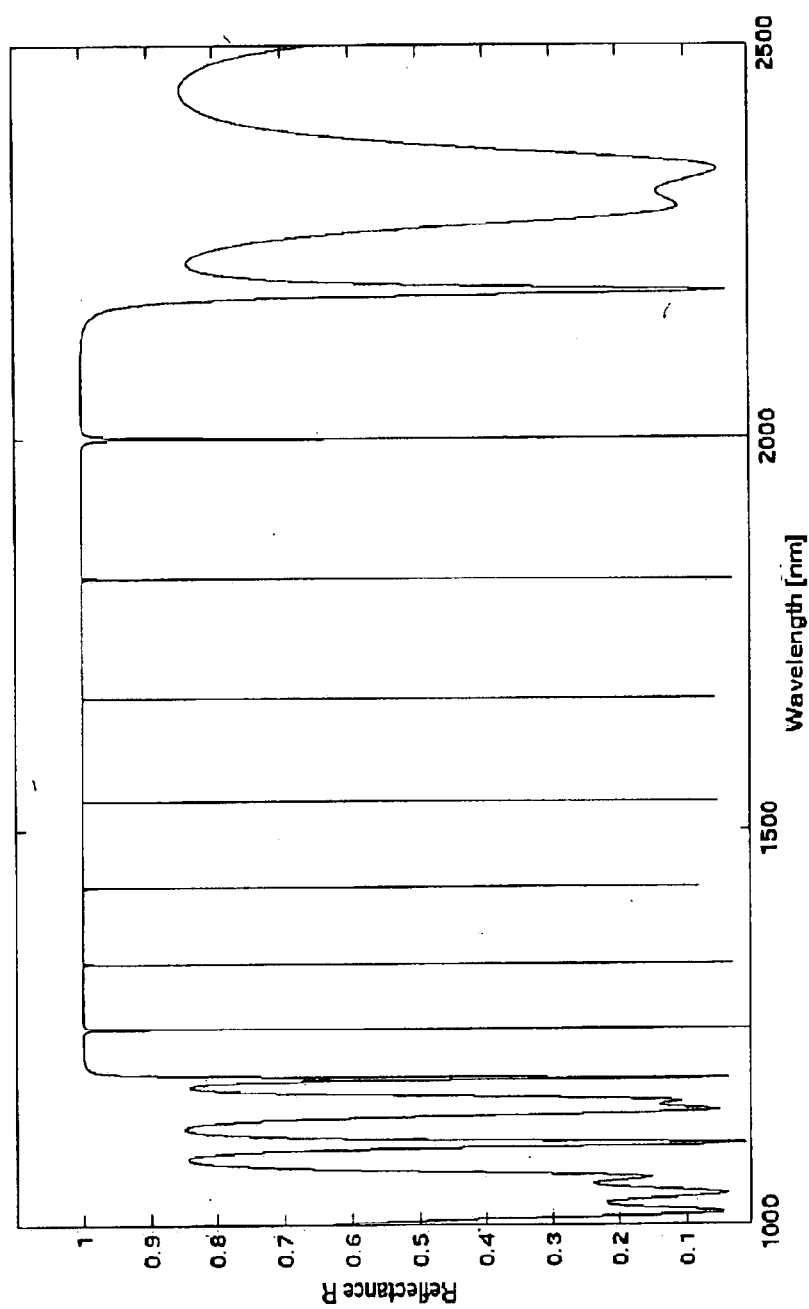
FIG. 2 is a graph showing the multiple resonance modes within a large photonic band gap (PBG)

FIG. 2 is a graph showing the multiple resonance modes within a large photonic band gap (PBG). The invention provides for multiple resonance states within a large PBG. Large defects, which are put in the cavity region of a PBG device, induce multiple resonance states with very large free spectral range (FSR). Using an appropriate design, two telecom wavelengths windows at 1.55 μm and 1.3 μm can be among the multiple resonance states. The flexibility with the defect size and large FSR makes the PBG device useful in producing photonic devices, such as filters, switches, modulators, and amplifiers. These devices can function simultaneously at many different wavelength windows, while the large FSR ensure that they function independently.

In particular, FIG. 2 illustrates the various modes within a large PBG. It is understood that the PBG range is 1000 nm, with the interested telecom wavelength around 1.55 μm and 1.3 μm. The FSR is approximately 100 nm.

Figure 3:
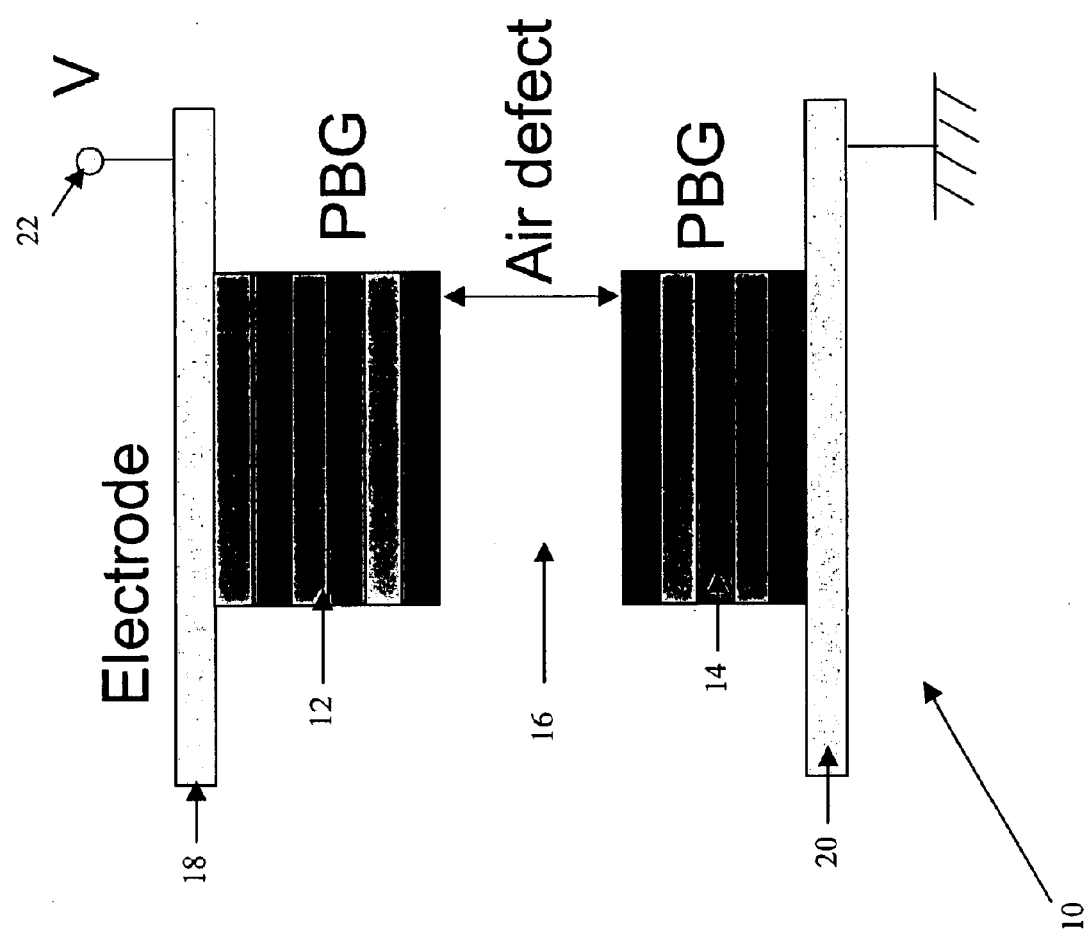
FIG. 3 is a schematic block diagram of a tunable PBG device having an air defect.

FIG. 3 is a schematic block diagram of a tunable PBG device 10 having an air defect. The PBG device 10 is arranged to have two mirror regions 12, 14, where each of the mirror regions 12, 14 has the same alternating layers of Si and SiO$_2$, described in FIG. 1. In addition, the PBG device 10 includes a cavity region 16 that is an air gap having a defined thickness. The top and bottom mirror regions 12, 14 form the air gap 16, which is suspended by beams 18. Applying a voltage 22 between the membrane 18 and substrate 20 can vary the thickness of the air gap 16.

In this embodiment, the air gap 16 has a thickness of approximately 4310 nm. The thickness of the alternating layers of Si and SiO$_2$ layers are 86 nm and 205 nm, respectively, for both mirror regions 12, 14, but these thicknesses can vary in other embodiments. Also, other embodiments can use more than 2 alternating layers. There can be other material combinations used by the alternating layers, such as SiN$_x$ and SiO$_2$. There can also be more than 10 resonances in the PBG device 10, which will be described hereinafter. Furthermore, the PBG device 10 can have a 2-D PBG or more in accordance with invention.

Wide wavelength tunable range, such as 100 nm, can be achieved by varying the thickness of the air gap 16. In this case, a cavity length change of 8% corresponds to a 60 nm tuning or larger. The change in wavelength is also approximately 8% in this system, where the change of wavelength is defined as $$\frac{\Delta\lambda}{\lambda} = \frac{\gamma\Delta d}{L_{eff}} \sim \frac{\Delta d}{d},$$

where d is the air gap distance, Leff is the effective length of the PBG device. This result is considerable when compared to a system using refractive index change for tuning, where the change in wavelength is at most approximately 0.3%. The 60 nm shift is achieved by applying up to 10 V.

Multiple localized states within the PBG device 10 having air defects are observed. By employing the Micro-Electro-Mechanical-System (MEMS) method, which can change the air gap 16 thickness, low voltage tuning around the two telecom wavelengths of 1.55 μm and 1.3 μm by electrostatic force can be realized.

The switching speed critically depends on the mechanical properties of the membrane, especially the resonance frequency of the top membrane 18. The stress of the top mirror region 12 is critical for the light signal, so detailed balance is necessary.

Current photonic devices are largely based on III–IV materials, which are expensive and difficult to integrate with Si-based VLSI technology. The invention uses a Si-based CMOS compatible process at low temperature for the formation of the mirror regions. The importance is two fold, the first is the future integratibility with current CMOS based microelectronics devices, the second is the low temperature process used in fabrication. This reduces the stress of the deposited film. Also, polymer materials can be used only at the relatively low temperature process.

The key to achieving low voltage tuning is to choose materials having a low Young's modulus as a supporting membrane 18 and deposit the materials as thin as possible. Other techniques can be used.

Figure 4:
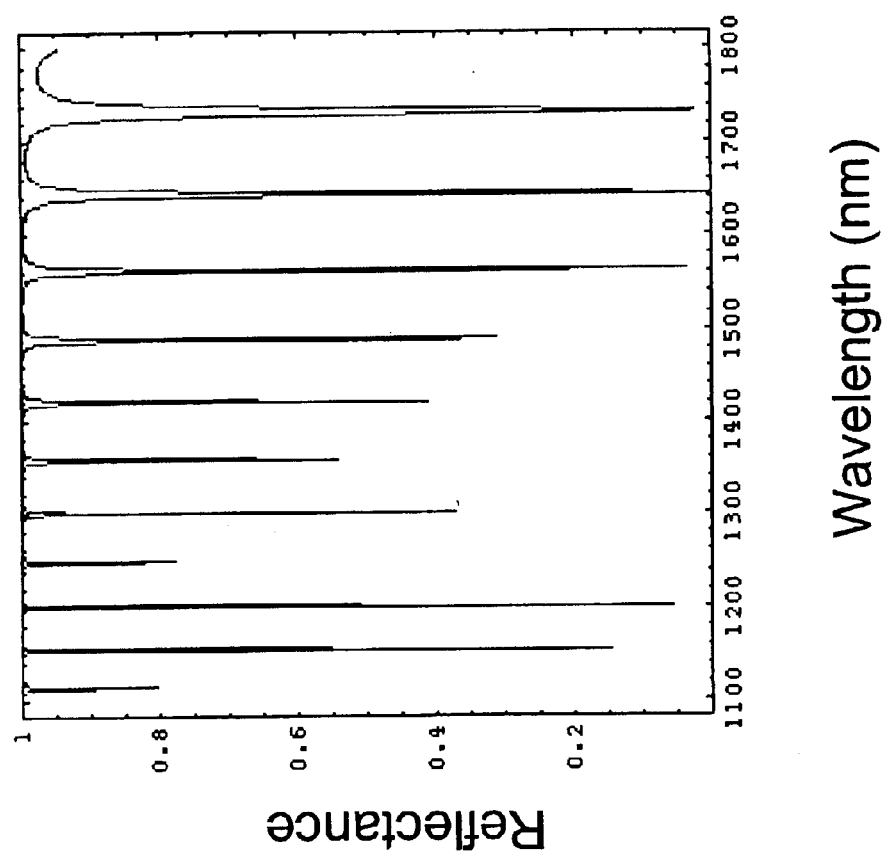
FIG. 4 is a graph demonstrating the reflectance spectrum of the PBG device described in FIG. 3.

FIG. 4 is a graph demonstrating the reflectance spectrum of the PBG device described in FIG. 3. The invention provides for multiple resonance states within a large PBG. The air gap cavity region induces multiple resonance states with very large FSR. Furthermore, the two-telecom wavelengths windows at 1.55 μm and 1.3 μm are among the multiple resonance states shown.

Figure 5:
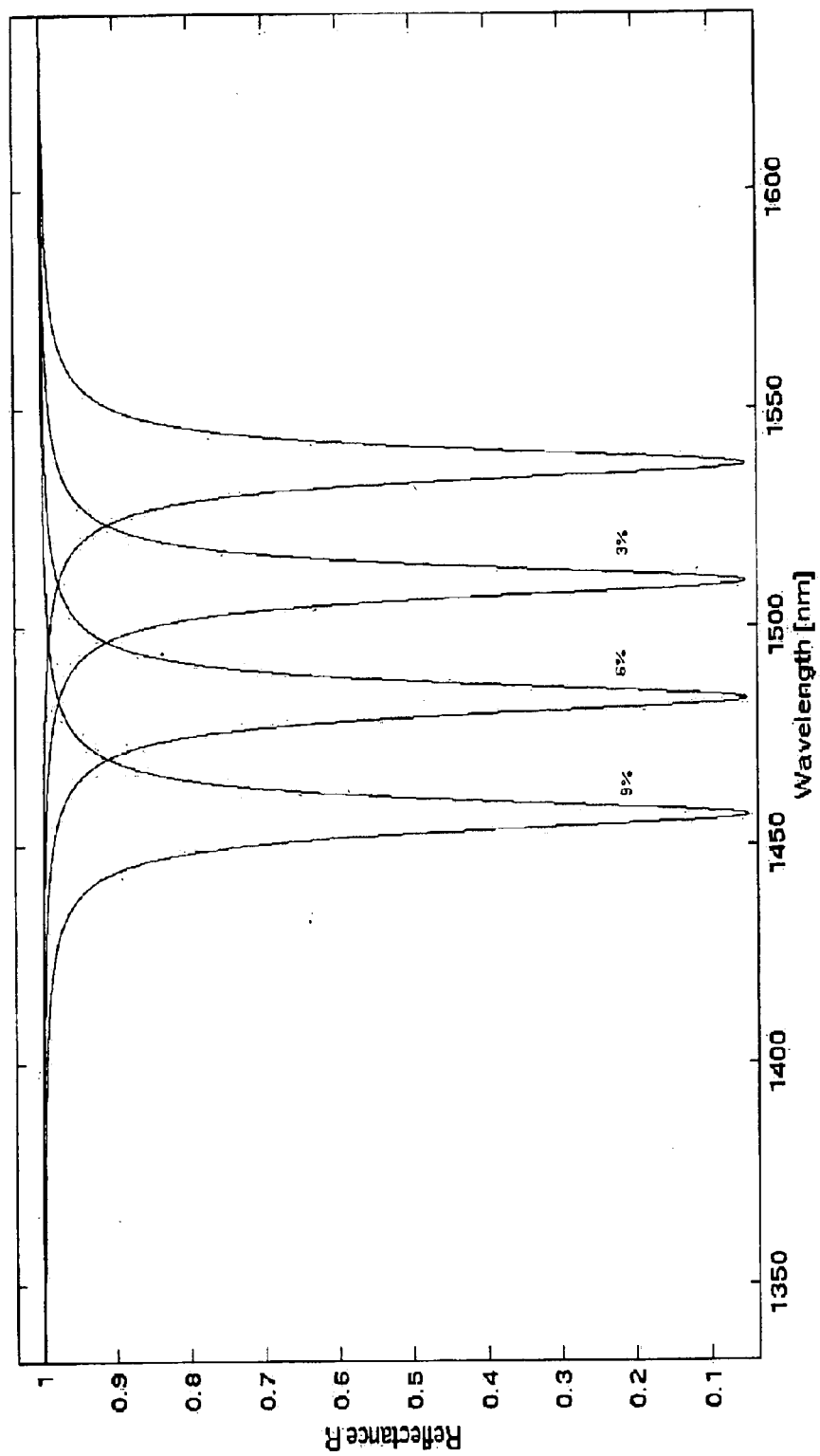
FIG. 5 is a graph demonstrating resonance wavelength tuning performed by the invention.

FIG. 5 is a graph demonstrating resonance wavelength tuning performed by the invention. In particular, FIG. 5 shows the changing of the resonance wavelengths by 3%, 6%, and 9%. The original resonance wavelength is 1.55 μm. The PBG device can easily tune its resonance wavelength by 3%, 5%, and 9% with no difficulty.

Figure 6:
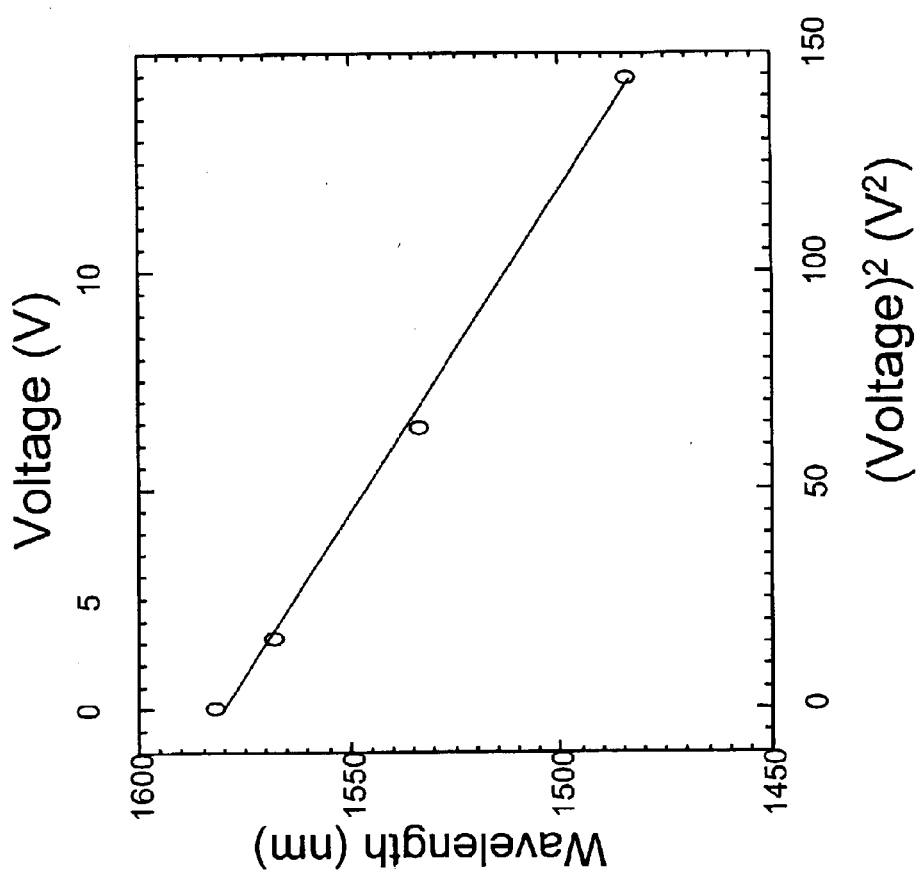
FIG. 6 is a graph demonstrating the relationship between resonance wavelength and voltage of the PBG device of FIG. 3.

FIG. 6 is a graph demonstrating the relationship between resonance wavelength and voltage of the PBG device of FIG. 3. In particular, FIG. 6 shows low voltage tuning at 1.55 μm. As discussed herein, applying voltage reduces the air defect thickness, which results in resonance blue-shift. For example, there is at 5 V a shift of 17.5 nm, while at 10V there is a shift of 65 nm. The relationship between resonance wavelength and square of the voltage applied is linear. Furthermore, this relationship confirms the electrostatic force tuning.

Figure 7:
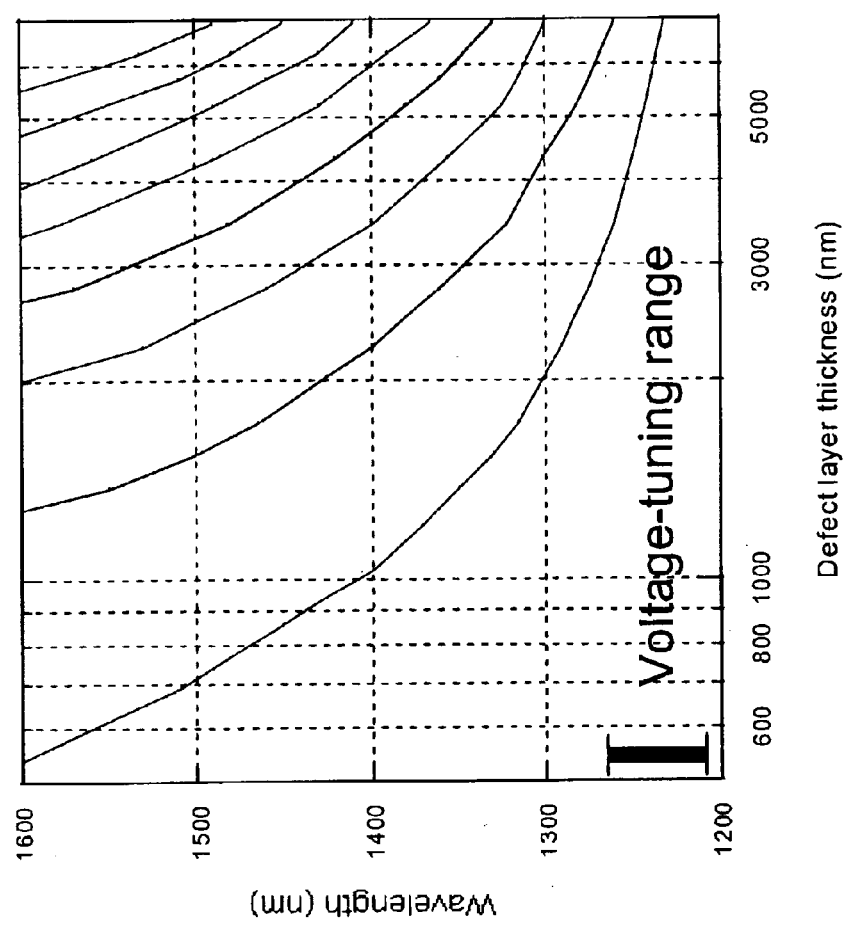
FIG. 7 is a graph demonstrating the relationship between the thickness of the air gap and resonant wavelength.

FIG. 7 is a graph demonstrating the relationship between the thickness of the air gap and resonant wavelength. In particular, FIG. 7 illustrates that increases in the air defect of the PBG device can reduce the resonant wavelength spacing. The voltage tuning range is at 10 V, which is shown by the bar. This shows that an 1-D PBG device having a resonant wavelength between 1300 nm and 1600 nm can have an air defect thickness of less than 5000 nm with a bias voltage of less than 10 V. However, the air defect thickness can vary depending on the materials comprising the PBG device.

The invention can be used in many microphotonic WDW systems. For example, the inventive PBG device can be used in Si CMOS compatible switches, modulators, amplifiers, and wavelength convertors. The PBG device can also be used in any optical application requiring the use of an optical filter.

Figure 8:
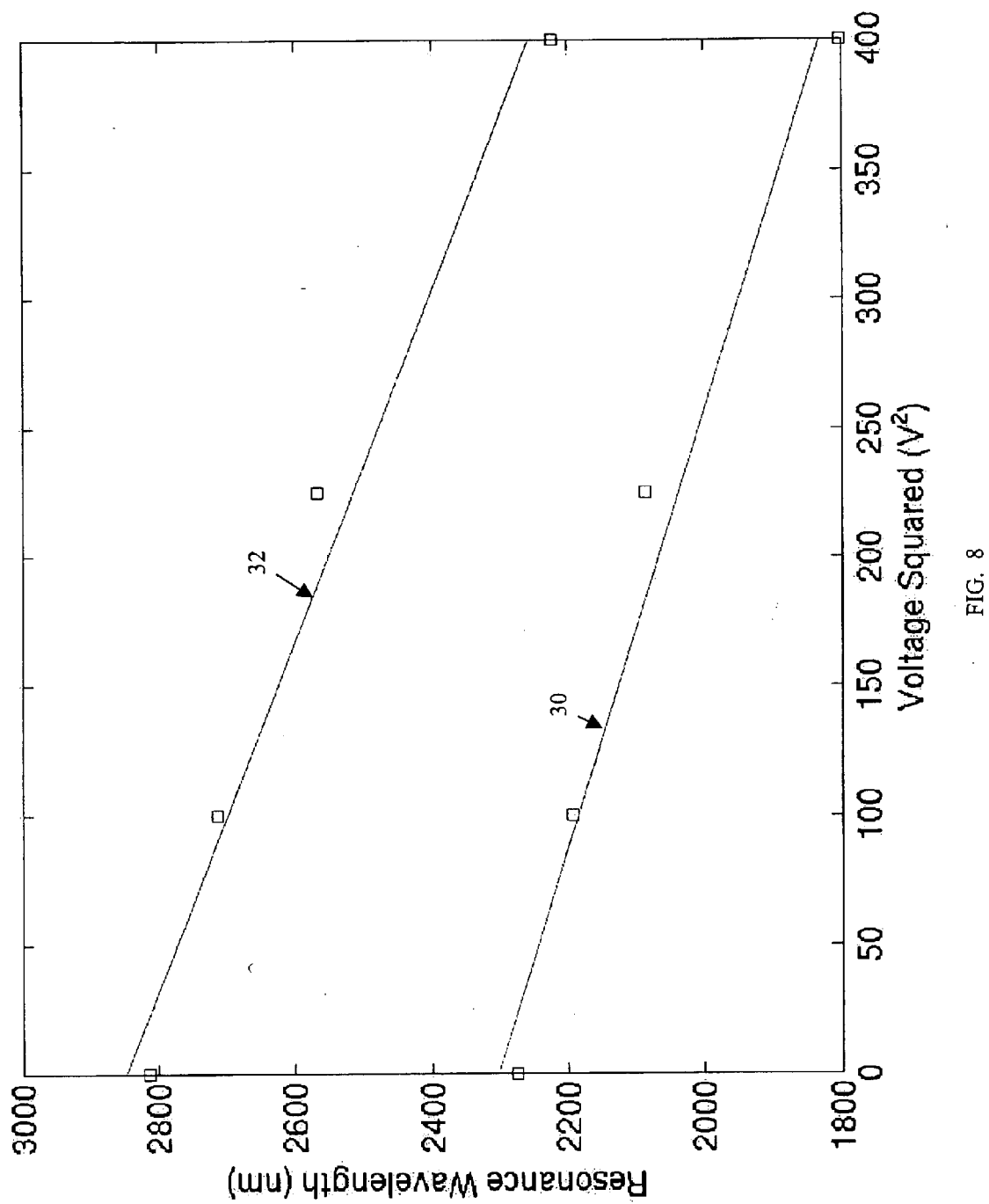
FIG. 8 is a graph demonstrating continuous tuning using the invention.

FIG. 8 is a graph demonstrating continuous tuning performed by the inventive PBG device. In particular, the graph shows two linear curves 30, 32. The resonant wavelengths are approximately at 2300 nm and 2800 nm. Note that the voltage range is between 0 and 20 V. At 0 V the linear curve 30 is at is it resonant wavelength of 2300 n. The linear curve 32 is at a wavelength of 2300 nm when a voltage of 20 V is applied. Therefore, the linear curves overlap at 2300 nm at 0 V and 20 V. Thus, the invention allows continuous tuning in the range between 1800 nm and 2800 nm. This is a significant tuning range.

Although the present invention has been shown and described with respect to several preferred embodiments thereof, various changes, omissions and additions to the form and detail thereof, may be made therein, without departing from the spirit and scope of the invention.

What is claimed is:

1. A photonic bandgap device comprising:
a first mirror region including alternating layers of different materials;

a second mirror region including alternating layers of different materials; and an air gap cavity region that is positioned between said first mirror region and second region, said air gap cavity region having a thickness between 3750 nm and 5000 nm when a voltage of less than or egual to 10 V is applied so that said device is tuned to a particular resonant wavelength.

2. The device of claim 1, wherein said resonant wavelength is 1.3 µm.

3. The device of claim 1, wherein said resonant wavelength is 1.55 µm.

4. The device of claim 1, wherein said voltage is 10 V.

5. The device of claim 1, wherein said first mirror region comprises alternating layers of Si and $SiO_2$.

6. The device of claim 5, wherein said Si layer comprises a thickness of 86 nm.

7. The device of claim 5, wherein said $SiO_2$ layer is comprised of a thickness of 205 nm.

8. The device of claim 1, wherein said second mirror region comprises alternating layers of Si and $SiO_2$.

9. The device of claim 8, wherein said Si layer comprises a thickness of 86 nm.

10. The device of claim 8, wherein said $SiO_2$ layer comprises a thickness of 205 nm.

11. The device of claim 4, wherein thickness of said air gap cavity region is 5000 nm.

12. A method of forming a photonic bandgap device, said method comprising:

providing a first mirror region including alternating layers of different materials;

providing a second mirror region including alternating layers of different materials; and forming an air gap cavity region that is positipned between said first mirror region and second region, said air gap cavity having a thickness between 3750 nm and 5000 nm when a voltage of less than or equal to 10 V applied so that said device is tuned to a particular resonant wavelength.

13. The method of claim 12, wherein said resonant wavelength is 1.3 µm.

14. The method of claim 12, wherein said resonant wavelength is 1.55 µm.

15. The method of claim 12, wherein said voltage is 10 V.

16. The method of claim 12, wherein said first mirror region comprises alternating layers of Si and $SiO_2$.

17. The method of claim 16, wherein said Si layer comprises a thickness of 86 nm.

18. The method of claim 16, wherein said $SiO_2$ layer comprises a thickness of 205 nm.

19. The method of claim 12, wherein said second mirror region comprises alternating layers of Si and $SiO_2$.

20. The method of claim 19, wherein said Si layer comprises a thickness of 86 nm.

21. The method of claim 19, wherein said $SiO_2$ layer comprises a thickness of 205 nm.

22. The method of claim 15, wherein thickness of said air gap cavity region is 5000 nm.

23. An optical filter comprising:

a first mirror region including alternating layers of different materials;

a second mirror region include including alternating layers of different materials; and an air gap cavity region that is positioned between said first mirror region and second region, said air gap cavity having a thickness between 3750 nm and 5000 nm when a voltage of less than or equal to 10 V ,is applied so that aid device is tuned to a particular resonant wavelength.

24. The filter of claim 23, wherein said resonant wavelength is 1.3 µm.

25. The filter of claim 23, wherein said resonant wavelength is 1.55 µm.

26. The filter of claim 23, wherein said voltage is 10 V.

27. The filter of claim 23, wherein said first mirror region comprises alternating layers of Si and $SiO_2$.

28. The filter of claim 27, wherein said Si layer comprises a thickness of 86 nm.

29. The filter of claim 27, wherein said $SiO_2$ layer comprises a thickness of 205 nm.

30. The filter of claim 23, wherein said second mirror region comprises alternating layers of Si and $SiO_2$.

31. The filter of claim 30, wherein said Si layer comprises a thickness of 86 nm.

32. The filter of claim 30, wherein said $SiO_2$ layer comprises a thickness of 205 nm.

33. The device of claim 27, wherein thickness of said air gap cavity region is 5000 nm.

34. A method of performing optical filtering, said method comprising:

providing a first mirror region including alternating layers of different materials having a high, but different index of refraction;

providing a second mirror region include including alternating layers of different materials having a high, but different index of refraction; and utilizing an air gap cavity region that is positioned between said first mirror region and second region, said air gap cavity having a thickess between 9 3750 nm and 5000 nm when a voltage of 10 V is applied so that said device is tuned to io a particular resonant wavelength.

35. The method of claim 34, wherein said resonant wavelength is 1.3 µm.

36. The method of claim 34, wherein said resonant wavelength is 1.55 µm.

37. The method of claim 34, wherein said voltage is 10 V.

38. The method of claim 34, wherein said first mirror region comprises alternating layers of Si and $SiO_2$.

39. The method of claim 38, wherein said Si layer comprises a thickness of 86 nm.

40. The method of claim 38, wherein said $SiO_2$ layer comprises a thickness of 205 nm.

41. The method of claim 34, wherein said second mirror region comprises alternating layers of Si and $SiO_2$.

42. The method of claim 41, wherein said Si layer comprises a thickness of 86 nm.

43. The method of claim 41, wherein said $SiO_2$ layer comprises a thickness of 205 nm.

44. The method of claim 37, wherein thickness of said air gap cavity region is 5000 .

* * * * *